US012645561B2

(12) United States Patent
Ceesay et al.

(10) Patent No.: US 12,645,561 B2
(45) Date of Patent: Jun. 2, 2026

(54) ASSESSING COMPUTER CODE USING MACHINE LEARNING

(71) Applicant: Capital One Services, LLC, McLean, VA (US)

(72) Inventors: Ebrima N. Ceesay, Vienna, VA (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 196 days.

(21) Appl. No.: 18/411,826

(22) Filed: Jan. 12, 2024

(65) Prior Publication Data

US 2025/0231859 A1      Jul. 17, 2025

(51) Int. Cl.
G06F 11/3604 (2025.01)

(52) U.S. Cl.
CPC ................................. G06F 11/3608 (2013.01)

(58) Field of Classification Search
CPC .................................................... G06F 11/3608
See application file for complete search history.

(56) References Cited

U.S. PATENT DOCUMENTS

| | | | | | |
|---|---|---|---|---|---|
| 8,856,725 | B1 * | 10/2014 | Anderson | ................. | G06F 8/75 |
| | | | | | 717/103 |
| 9,201,646 | B2 * | 12/2015 | Balachandran | ........... | G06F 8/75 |
| 9,245,256 | B2 * | 1/2016 | Saraya | ................. | G06Q 10/103 |
| 9,436,446 | B1 * | 9/2016 | Gupta | ..................... | G06F 8/427 |
| 9,595,009 | B2 * | 3/2017 | Haynes | ................. | G06Q 10/00 |
| 9,600,275 | B2 * | 3/2017 | Fan | ........................... | G06F 8/73 |
| 9,898,280 | B2 * | 2/2018 | Balachandran | ........... | G06F 8/43 |
| 10,152,403 | B2 | 12/2018 | Kraft et al. | | |
| 10,635,409 | B2 | 4/2020 | Pradhan et al. | | |
| 10,789,150 | B2 * | 9/2020 | Keinan | ............... | G06F 11/3624 |
| 11,157,272 | B2 * | 10/2021 | Woulfe | ................. | G06N 3/044 |
| 11,321,644 | B2 * | 5/2022 | Hicks | ............. | G06Q 10/063112 |
| 11,392,844 | B1 * | 7/2022 | Rao | ..................... | G06F 11/3698 |
| 11,474,816 | B2 * | 10/2022 | Hicks | ..................... | G06Q 30/04 |
| 11,561,771 | B2 * | 1/2023 | Pezaris | ................... | G06F 8/33 |

(Continued)

FOREIGN PATENT DOCUMENTS

| | | | | |
|---|---|---|---|---|
| CN | 105159831 A | 12/2015 | | |
| EP | 3959601 B1 * | 6/2025 | ............. | G06F 8/427 |

OTHER PUBLICATIONS

Aryendu, Ishan, et al. "Intelligent code review assignment for large scale open source software stacks." Proceedings of the 37th IEEE/ACM International Conference on Automated Software Engineering. 2022.*

(Continued)

*Primary Examiner* — Francisco J Aponte
(74) *Attorney, Agent, or Firm* — Harrity & Harrity, LLP

(57) ABSTRACT

In some implementations, a development system may receive a set of computer code associated with a user. The development system may provide the set of computer code to a machine learning model to receive a set of quality indicators associated with the set of computer code. The development system may output, to a user device, the set of quality indicators. Additionally, the development system may determine, using the set of quality indicators, a possible mentor out of a plurality of additional users. The development system may transmit a message from the development system and to a device associated with the possible mentor.

20 Claims, 10 Drawing Sheets

(56) References Cited

U.S. PATENT DOCUMENTS

| | | | | |
|---|---|---|---|---|
| 11,610,173 | B2 * | 3/2023 | Sanchez | G06F 8/77 |
| 11,720,804 | B2 * | 8/2023 | Gupta | G06F 8/75 |
| | | | | 706/54 |
| 11,726,775 | B2 * | 8/2023 | Mahanta | G06F 11/3604 |
| | | | | 717/122 |
| 11,836,485 | B1 * | 12/2023 | Cancilla | G06F 8/75 |
| 11,914,976 | B2 * | 2/2024 | Pallapolu | G06F 8/41 |
| 11,922,143 | B1 * | 3/2024 | Shapiro | G06F 8/34 |
| 12,050,718 | B2 * | 7/2024 | Cuellar Jaramillo | |
| | | | | G06F 21/6245 |
| 12,093,675 | B2 * | 9/2024 | Chai | G06F 8/36 |
| 12,093,683 | B2 * | 9/2024 | Hicks | G06N 20/00 |
| 12,367,277 | B2 * | 7/2025 | Raju | G06F 11/3604 |
| 2009/0070734 | A1 | 3/2009 | Dixon et al. | |
| 2014/0188575 | A1 * | 7/2014 | Welzant | G06Q 50/205 |
| | | | | 705/7.39 |
| 2018/0285103 | A1 * | 10/2018 | Jha | G06F 8/71 |
| 2019/0259144 | A1 * | 8/2019 | Pathapati | G06T 7/0002 |
| 2019/0303140 | A1 * | 10/2019 | Kelly | G06N 3/08 |
| 2019/0324727 | A1 * | 10/2019 | Carranza | G06F 8/437 |
| 2020/0226055 | A1 * | 7/2020 | Lavigne | G06F 8/22 |
| 2021/0056211 | A1 * | 2/2021 | Olson | G06F 16/9027 |
| 2022/0244937 | A1 * | 8/2022 | Prasad | G06N 5/022 |
| 2022/0245055 | A1 * | 8/2022 | Chen | G06F 8/75 |
| 2022/0300884 | A1 * | 9/2022 | Sabharwal | G06Q 10/06395 |
| 2023/0039971 | A1 * | 2/2023 | Zheng | G06Q 40/12 |
| 2023/0095036 | A1 * | 3/2023 | Tripuraneni | G06Q 10/1053 |
| | | | | 705/7.42 |
| 2023/0145363 | A1 * | 5/2023 | Hatfield | G06F 16/9535 |
| | | | | 705/7.14 |
| 2023/0352147 | A1 * | 11/2023 | Abdolell | G16H 40/20 |
| 2023/0385042 | A1 * | 11/2023 | Obando Chacon | G06F 8/443 |
| 2024/0160435 | A1 * | 5/2024 | Duan | G06N 3/084 |
| 2024/0265101 | A1 * | 8/2024 | Sydow | G06F 8/42 |
| 2024/0319991 | A1 * | 9/2024 | Matthews | G06F 8/71 |
| 2025/0094728 | A1 * | 3/2025 | Ouyang | G06F 40/284 |
| 2025/0147872 | A1 * | 5/2025 | Selvaraj | G06F 11/3688 |

OTHER PUBLICATIONS

Vijayvergiya, Manushree, et al. "Ai-assisted assessment of coding practices in modern code review." Proceedings of the 1st ACM International Conference on AI-Powered Software. 2024.*

Madera, Michał, and Rafał Tomón. "A case study on machine learning model for code review expert system in software engineering." 2017 Federated Conference on Computer Science and Information Systems (FedCSIS). IEEE, 2017.*

* cited by examiner

100

145
Request for the
training module

150
Multimedia content associated
with the training module

Training host

User
device

400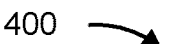

410 ⌇ Receive a set of computer code associated with a user

420 ⌇ Provide the set of computer code to a machine learning model to receive a set of quality indicators associated with the set of computer code 430 ⌇ Output the set of quality indicators to a user device 440 ⌇ Determine, using the set of quality indicators, at least one training module out of a plurality of possible training modules 450 ⌇ Output an indication of the at least one training module to the user device 460 ⌇ Determine, using the set of quality indicators, a possible mentor out of a plurality of additional users 470 ⌇ Transmit a message to a device associated with the possible mentor

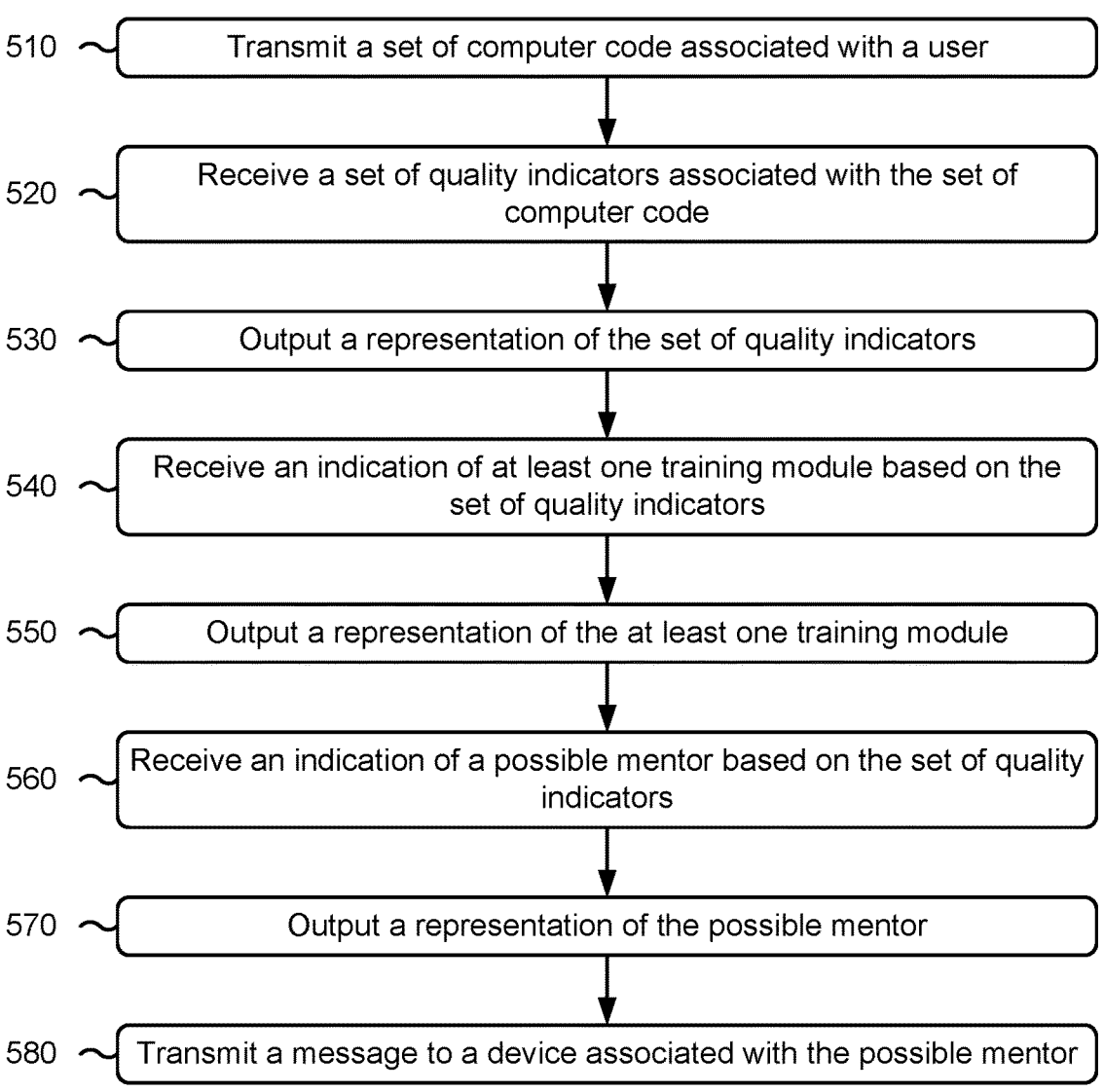

510    Transmit a set of computer code associated with a user

520    Receive a set of quality indicators associated with the set of computer code 530    Output a representation of the set of quality indicators 540    Receive an indication of at least one training module based on the set of quality indicators 550    Output a representation of the at least one training module 560    Receive an indication of a possible mentor based on the set of quality indicators 570    Output a representation of the possible mentor 580    Transmit a message to a device associated with the possible mentor

FIG. 5

ASSESSING COMPUTER CODE USING MACHINE LEARNING

BACKGROUND

Computer code is often developed in teams. For example, a computer program may be compiled from multiple code files, and different developers may work on different code files (or even different portions of a same code file). However, different developers have different styles and expertises. Therefore, one developer may introduce unnecessary complexities or vulnerabilities into a portion of a computer program that could have been avoided by a different developer.

SUMMARY

Some implementations described herein relate to a system for assessing computer code using machine learning. The system may include one or more memories and one or more processors communicatively coupled to the one or more memories. The one or more processors may be configured to receive a set of computer code associated with a user. The one or more processors may be configured to provide the set of computer code to a machine learning model to receive a set of quality indicators associated with the set of computer code. The one or more processors may be configured to output the set of quality indicators to a user device. The one or more processors may be configured to determine, using the set of quality indicators, at least one training module out of a plurality of possible training modules. The one or more processors may be configured to output an indication of the at least one training module to the user device. The one or more processors may be configured to determine, using the set of quality indicators, a possible mentor out of a plurality of additional users. The one or more processors may be configured to transmit a message to a device associated with the possible mentor.

Some implementations described herein relate to a method of assessing computer code using machine learning. The method may include receiving, at a development system, a set of computer code associated with a user. The method may include providing, by the development system, the set of computer code to a machine learning model to receive a set of quality indicators associated with the set of computer code. The method may include outputting, from the development system and to a user device, the set of quality indicators. The method may include determining, by the development system and using the set of quality indicators, a possible mentor out of a plurality of additional users. The method may include transmitting a message from the development system and to a device associated with the possible mentor.

Some implementations described herein relate to a non-transitory computer-readable medium that stores a set of instructions for assessing computer code using machine learning. The set of instructions, when executed by one or more processors of a device, may cause the device to transmit a set of computer code associated with a user. The set of instructions, when executed by one or more processors of the device, may cause the device to receive a set of quality indicators associated with the set of computer code. The set of instructions, when executed by one or more processors of the device, may cause the device to output a representation of the set of quality indicators. The set of instructions, when executed by one or more processors of the device, may cause the device to receive an indication of at least one training module based on the set of quality indicators. The set of instructions, when executed by one or more processors of the device, may cause the device to output a representation of the at least one training module. The set of instructions, when executed by one or more processors of the device, may cause the device to receive an indication of a possible mentor based on the set of quality indicators. The set of instructions, when executed by one or more processors of the device, may cause the device to output a representation of the possible mentor. The set of instructions, when executed by one or more processors of the device, may cause the device to transmit a message to a device associated with the possible mentor.

BRIEF DESCRIPTION OF THE DRAWINGS

FIG. 4 is a flowchart of an example process relating to assessing computer code using machine learning, in accordance with some embodiments of the present disclosure.

FIG. 5 is a flowchart of an example process relating to receiving computer code quality indicators based on machine learning, in accordance with some embodiments of the present disclosure.

DETAILED DESCRIPTION

The following detailed description of example implementations refers to the accompanying drawings. The same reference numbers in different drawings may identify the same or similar elements.

A computer program may be compiled from multiple code files, and different developers may work on different code files (or even different portions of a same code file). However, different developers have different styles and expertises. Therefore, one developer may introduce unnecessary complexities or vulnerabilities into a portion of a computer program that could have been avoided by a different developer. As a result, the computer program may waste computing resources, allow a security breach, or otherwise cause computing problems when deployed.

Machine learning models have been developed that assess computer code for quality. However, merely informing a developer that quality is low is unlikely to improve that developer's code in the future. Accordingly, computer resources expended in running the machine learning models may be wasted because the developer continues to introduce similar problems into future computer programs. Additionally, those future computer programs may waste computing resources, allow a security breach, or otherwise cause computing problems when deployed.

Some implementations described herein enable a developer to receive trainings and mentorship based on computer code quality determined by a machine learning model. As a result, a developer is more likely to improve based on the trainings and the mentorship, and the computer resources expended in running the machine learning model are efficiently used rather than wasted. Additionally, because the developer is less likely to introduce similar problems into future computer programs, the future computer programs are less likely to waste computing resources, allow a security breach, or otherwise cause computing problems when deployed.

FIGS. 1A-1F are diagrams of an example 100 associated with assessing computer code using machine learning. As shown in FIGS. 1A-1F, example 100 includes a user device, a development system, a code repository, a machine learning (ML) model (e.g., provided by an ML host), a training host, and a mentor device. These devices are described in more detail in connection with FIGS. 2 and 3.

Figure 1A:
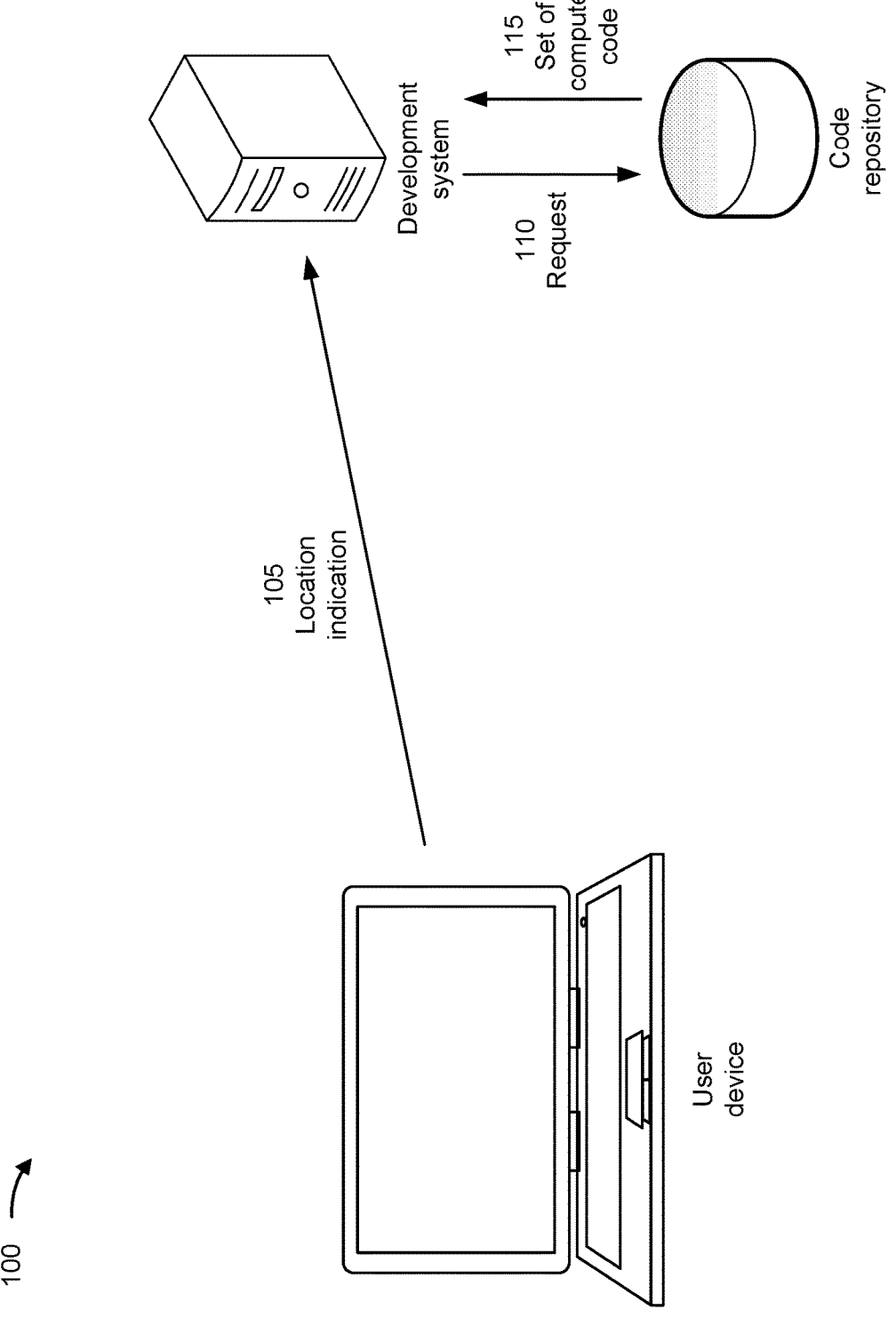
FIGS. 1A-1F are diagrams of an example implementation relating to assessing computer code using machine learning, in accordance with some embodiments of the present disclosure.

As shown in FIG. 1A and by reference number 105, the user device may transmit, and the development system may receive, an indication of a location of a set of computer code. The set of computer code may comprise files (e.g., one or more files). In other words, the set of computer code may be included in (e.g., encoded in) the files. For example, the files may include library files (e.g., from the C++ Standard Library, the Python® Standard Library, or the Java® Class Library, among other examples) in addition to source code files.

The location may include a filename, a file path, a project name, an alphanumeric identifier associated with the set of computer code, and/or another type of identifier that indicates where the set of computer code is stored. Additionally, or alternatively, the location may include an Internet protocol (IP) address, a medium access control (MAC) address, and/or another type of identifier of the code repository that store the set of computer code.

Additionally, the set of computer code may be associated with a developer. For example, the developer may be a user of the user device. Additionally, or alternatively, the developer may be associated with an account, and the user device may transmit, and the development system may receive, a set of credentials associated with the account in order to authenticate the developer. Accordingly, the development system may receive the set of computer code based on authenticating the set of credentials.

In one example, the user of the user device may provide input (e.g., using an input component of the user device) that triggers the user device to transmit the indication. For example, a web browser (or another type of application executed by the user device) may navigate to a website hosted by (or at least associated with) the development system and provide a user interface (UI) to the user (e.g., using an output component of the user device). Accordingly, the user may interact with the UI to trigger the user device to transmit the indication. Additionally, or alternatively, the user device may transmit the indication automatically. For example, the user device may transmit the indication periodically (e.g., according to a schedule) and/or in response to a trigger event (e.g., when the user of the user device modifies the set of computer code).

In some implementations, the user device may additionally transmit, and the development system may further receive, a set of credentials associated with the code repository that stores the set of computer code. The set of credentials may include a username and password, a passcode, a secret answer, a certificate, a private key, and/or biometric information, among other examples. The set of credentials may allow the development system to access the set of computer code from the code repository, as described in connection with reference numbers 110 and 115. In some implementations, the user device may transmit the indication of the location and the set of credentials in a same message. Alternatively, the user device may transmit the indication of the location in a different message than the set of credentials. For example, the development system may transmit, and the user device may receive, a request for credentials in response to the indication of the location. Accordingly, the user device may transmit the set of credentials in response to the request from the development system.

As shown by reference number 110, the development system may transmit, and the code repository may receive, a request for the set of computer code. The request may include a hypertext transfer protocol (HTTP) request, a file transfer protocol (FTP) request, and/or an application programming interface (API) call. The request may include (e.g., in a header and/or as an argument) an indication of the location of the set of computer code. For example, the request may include a filename, a file path, a folder name, a project name, and/or another type of identifier associated with the set of computer code.

As shown by reference number 115, the code repository may transmit, and the development system may receive, the set of computer code. For example, the code repository may transmit, and the development system may receive, the set of computer code (e.g., the set of files including the set of computer code) in response to the request from the code repository. The set of computer code may be included in an HTTP response, an FTP response, and/or a return from an API function.

Although the example 100 is described with the development system as separate (e.g., physically, logically, and/or virtually) from the code repository, other examples may include the development system as at least partially integrated (e.g., physically, logically, and/or virtually) with the code repository. For example, the development system may include software that executes over (and/or is supported by) hardware of the code repository. In another example, the development system and the code repository may execute over (and/or be supported by) a same cloud computing system (e.g., as described in connection with FIG. 2).

Additionally, or alternatively, although the example 100 is described in connection with the user device transmitting the indication of the location, other examples may include the user device transmitting (at least a portion of) the set of computer code. For example, the user device may transmit, and the development system may receive, the set of computer code (e.g., the set of files including the set of computer code).

Additionally, or alternatively, although the example 100 is described in connection with the development system the user device triggering the development system to receive the set of computer code, other examples may include the code repository triggering the development system to receive the set of computer code. In some implementations, the code repository may transmit, and the development system may receive, the set of computer code in response to a trigger event. For example, the developer may modify the set of computer code, and the modification may trigger the code repository to transmit the set of computer code to the development system. Additionally, or alternatively, the code repository may receive a pull request associated with the developer, and the pull request may trigger the code repository to transmit the set of computer code to the development system.

Figure 1B:
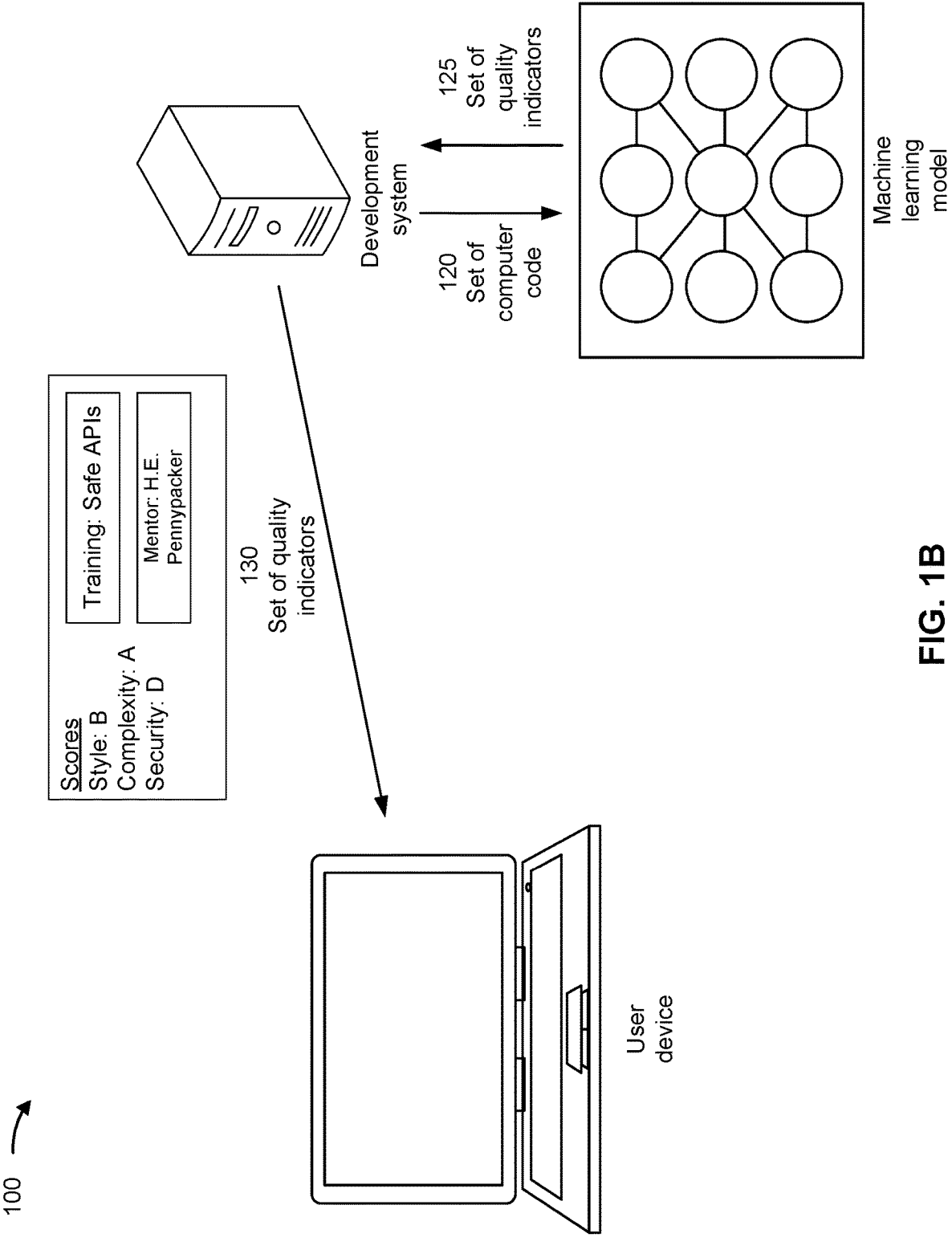

As shown in FIG. 1B and by reference number 120, the development system may provide the set of computer code to the ML model. For example, the development system may transmit, and the ML host may receive, a request including the set of computer code. The ML model may be trained (e.g., by the ML host and/or a device at least partially separate from the ML host) using labeled sets of computer code (e.g., for supervised learning). Additionally, or alternatively, the ML model may be trained using unlabeled sets of computer code (e.g., for deep learning). In one example, the ML model may be configured to compare the set of computer code to previous computer code labeled as high quality (e.g., in order to suggest changes to the set of computer code based on the comparison). Additionally, or alternatively, the ML model may be configured to cluster the set of computer code with previous computer code.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., existing sets of computer code). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 125, the development system may receive a set of quality indicators from the ML model (e.g., from the ML host). The set of quality indicators may be associated with the set of computer code and may include a qualitative indicator (e.g., a short description of a problem in the set of computer code) and/or a quantitative indicator (e.g., a numerical score, a letter grade, and/or another type of qualitative measure of quality of the set of computer code, whether overall or along a particular dimension or category). In some implementations, the set of quality indicators may include a quality indicator associated with a style rule (e.g., based on a spacing rule, a punctuation rule, a variable naming convention, and/or a function naming convention, among other examples), a quality indicator associated with a complexity rule (e.g., based on preferring looping functions to recursive function calls, minimizing cyclomatic complexity, and/or reducing bugs per lines, among other examples), and/or a quality indicator associated with a security rule (e.g., based on a number of open API functions, a number of pointers used, and/or a number of possible buffer overflows, among other examples).

Therefore, the ML model may measure quality of the set of computer code across a plurality of dimensions, and each quality indicator in the set of quality indicators may be associated with a different dimension. Additionally, or alternatively, the ML model may suggest a revision (e.g., one or more revisions) to the set of computer code (e.g., based on comparing the set of computer code to other sets of computer code labeled as high quality).

As shown by reference number 130, the development system may output the set of quality indicators to the user device. For example, the development system may transmit, and the user device may receive, the set of quality indicators in response to the indication from the user device (e.g., as described in connection with reference number 105).

The user device may output a representation of the set of quality indicators. In some implementations, the set of quality indicators may be included in a message, such as an email message and/or a text message, among other examples. Accordingly, the user device may output the message to the user (e.g., using an output component of the user device). Additionally, or alternatively, the development system may transmit instructions for a UI that includes the set of quality indicators. Accordingly, the user device may output the UI to the user (e.g., using an output component of the user device). As shown in FIG. 1B, the representation of the set of quality indicators may be included in a same UI as a representation of a training module (e.g., as described in connection with FIG. 1C) and/or a representation of a possible mentor (e.g., as described in connection with FIG. 1E). In FIG. 1B, the representation of the set of quality indictors includes text, but other examples may include visualizations in addition to, or in lieu of, the text. In FIG. 1B, the representation of the training module and the representation of the possible mentor each include a button, but other examples may include other interactive elements and/or text.

Figure 1C:
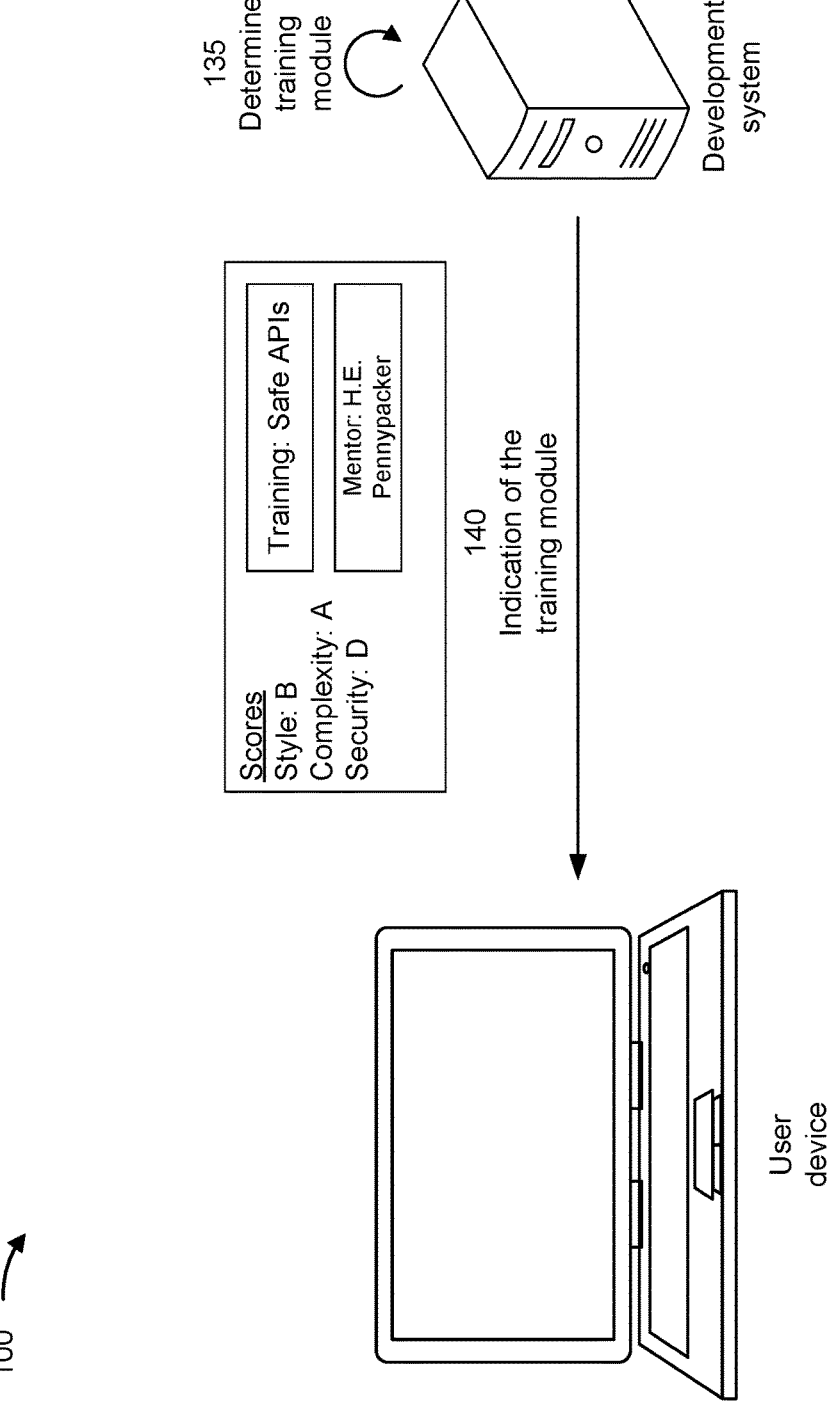

As shown in FIG. 1C and by reference number 135, the development system may determine a training module (e.g., at least one training module) for the developer. The training module may be selected out of a plurality of possible training modules. For example, a library accessible by the development system (and the user device) may include the plurality of possible training modules, and the development system may use a list of (or another type of data structure encoding) the plurality of possible training modules from which to select the training module. The development system may determine the training module using the set of quality indicators. For example, the development system may map the set of quality indicators to the training module (e.g., mapping a quality indicator associated with low security to a training on improving security in computer code, among other examples). Additionally, or alternatively, the ML model may output, and the development system may receive, an indication of the training module (e.g., together with the set of quality indicators).

As shown by reference number 140, the development system may output an indication of the training module to the user device. For example, the development system may transmit, and the user device may receive, the indication of the training module (based on the set of quality indicators) in response to the indication from the user device (e.g., as described in connection with reference number 105).

The user device may output a representation of the training module. In some implementations, the indication of the training module may be included in a message, such as an email message and/or a text message, among other examples. Accordingly, the user device may output the message to the user (e.g., using an output component of the user device). Additionally, or alternatively, the development system may transmit instructions for a UI that includes the indication of the training module. Accordingly, the user device may output the UI to the user (e.g., using an output component of the user device). As shown in FIG. 1C, the representation of the training module may be included in a same UI as a representation of the set of quality indicators (e.g., as described in connection with FIG. 1B) and/or a representation of a possible mentor (e.g., as described in connection with FIG. 1E). In FIG. 1C, the representation of the training module and the representation of the possible mentor each include a button, but other examples may include other interactive elements and/or text. In FIG. 1C, the representation of the set of quality indictors includes text, but other examples may include visualizations in addition to, or in lieu of, the text.

Figure 1D:
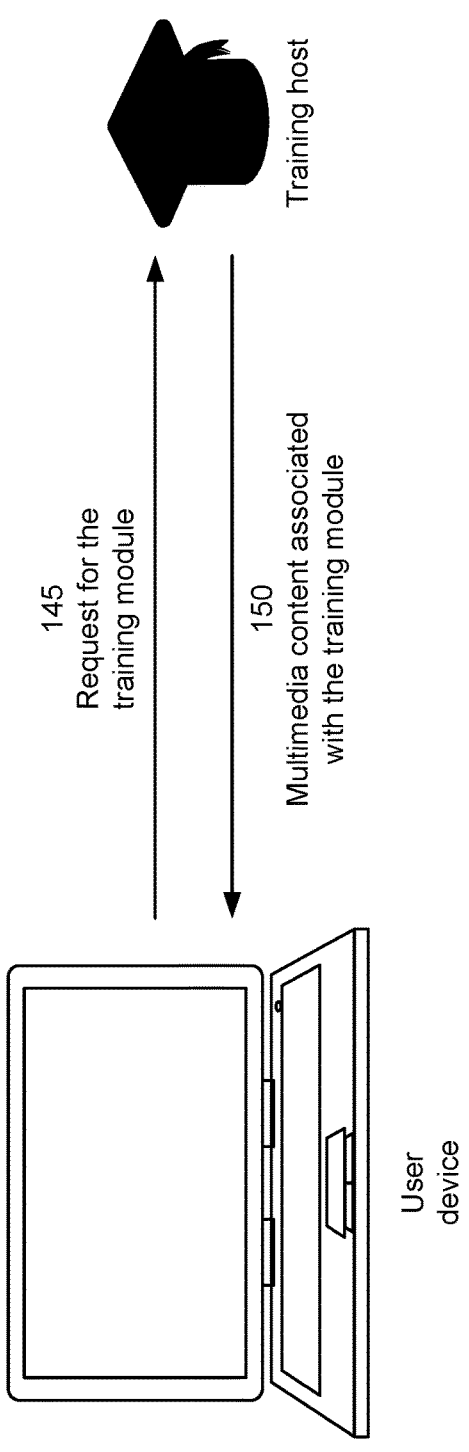
Figure 1D:

As shown in FIG. 1D and by reference number 145, the user device may transmit, and the training host may receive, a request for the training module. The request may include an HTTP request, an FTP request, and/or an API call. The request may include (e.g., in a header and/or as an argument) an identifier associated with the training model (e.g., a title and/or another alphanumeric identifier associated with the training module). In one example, the user of the user device may provide a confirmation (e.g., using an input component of the user device) that triggers the user device to transmit the request. For example, the user device may output a UI, indicating the training module, to the user (e.g., using an output component of the user device). Accordingly, the user may interact with the UI (e.g., with a button or another interactive element associated with the training module, as shown in FIGS. 1B and 1C) to trigger the user device to transmit the request. By providing a direct link to the training module, the UI may conserve power and processing resources that otherwise would have been expended by the user searching for the training module in order to request the training model.

As shown by reference number 150, the training host may transmit, and the user device may receive, multimedia content associated with the training module. For example, the training host may transmit, and the user device may receive, the multimedia content in response to the request from the user device. Accordingly, the user device may output the multimedia content to the user (e.g., via an output component of the user device). For example, the user device may provide a frame (and/or another element of a UI) that includes the multimedia content.

Figure 1E:
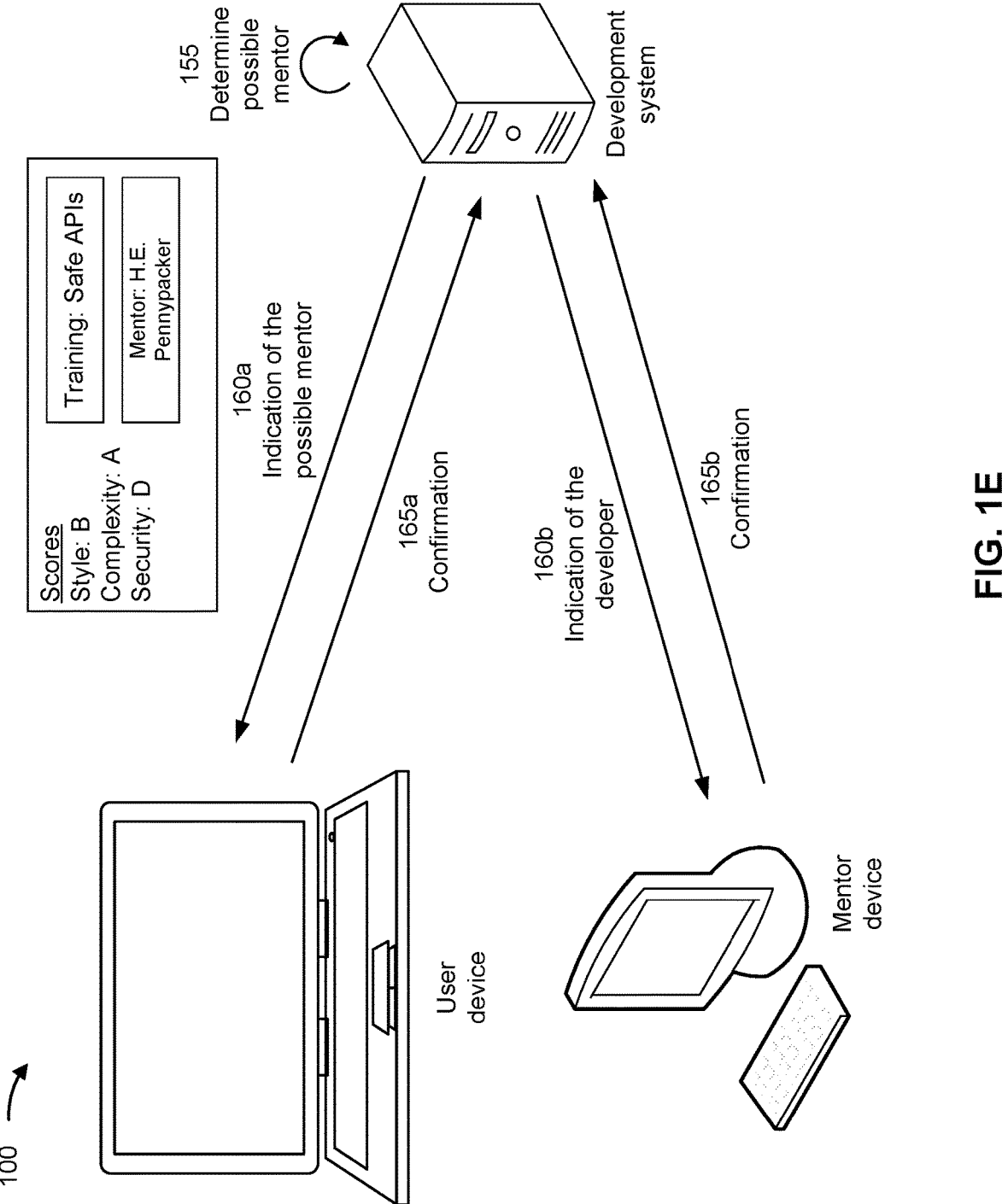

As shown in FIG. 1E and by reference number 155, the development system may additionally, or alternatively, determine a possible mentor (e.g., at least one possible mentor) for the developer. The possible mentor may be selected out of a plurality of additional developers (e.g., a plurality of additional users). For example, a library accessible by the development system (and the user device) may include the plurality of additional developers, and the development system may use a list of (or another type of data structure encoding) the plurality of additional developers from which to select the possible mentor. The development system may determine the possible mentor using the set of quality indicators. For example, the development system may map the set of quality indicators to a set of expertises associated with the possible mentor (e.g., mapping a quality indicator associated with low security to an additional developer labeled as having expertise in security, among other examples). Additionally, or alternatively, the ML model may output, and the development system may receive, an indication of the possible mentor (e.g., together with the set of quality indicators).

In some implementations, the ML model may output a list of mentors, and the development system may select the possible mentor from the list of mentors. In some implementations, the development system may select the possible mentor based on availabilities associated with the list of mentors. For example, the development system may select the possible mentor based on the possible mentor having a maximum availability out of the list of mentors. Additionally, or alternatively, the development system may select the possible mentor based on the possible mentor being included in a same team as the developer. Additionally, or alternatively, the development system may select the possible mentor based on a round robin system. For example, the development system may refrain from assigning developers to a same mentor over and over and instead select the possible mentor based on the possible mentor not being recently assigned. Additionally, or alternatively, the development system may select the possible mentor from the list of mentors randomly (or at least pseudo-randomly).

As shown by reference number 160a, the development system may output an indication of the possible mentor to the user device. For example, the development system may transmit, and the user device may receive, the indication of the possible mentor (based on the set of quality indicators) in response to the indication from the user device (e.g., as described in connection with reference number 105).

The user device may output a representation of the possible mentor. In some implementations, the indication of the possible mentor may be included in a message, such as an email message and/or a text message, among other examples. Accordingly, the user device may output the message to the user (e.g., using an output component of the user device). Additionally, or alternatively, the development system may transmit instructions for a UI that includes the indication of the possible mentor. Accordingly, the user device may output the UI to the user (e.g., using an output component of the user device). As shown in FIG. 1E, the representation of the training module may be included in a same UI as a representation of the set of quality indicators (e.g., as described in connection with FIG. 1B) and/or a representation of the training module (e.g., as described in connection with FIG. 1C). In FIG. 1E, the representation of the possible mentor and the representation of the training module each include a button, but other examples may include other interactive elements and/or text. In FIG. 1E, the representation of the set of quality indictors includes text, but other examples may include visualizations in addition to, or in lieu of, the text.

As shown by reference number 165a, the user device may transmit, and the development system may receive, a confirmation associated with the possible mentor. In one example, the user of the user device may provide input (e.g., using an input component of the user device) that triggers the user device to transmit the confirmation. For example, the user device may output a UI, indicating the possible mentor, to the user (e.g., using an output component of the user device). Accordingly, the user may interact with the UI (e.g., with a button or another interactive element associated with the possible mentor, as shown in FIGS. 1B, 1C, and 1E) to trigger the user device to transmit the confirmation.

By refraining from contacting the possible mentor (e.g., as described in connection with FIG. 1F) until the developer provides the confirmation, the development system saves the possible mentor's time and conserves network resources that otherwise would have been wasted in contacting the possible mentor when the developer did not want to do so.

Additionally, or alternatively, shown by reference number 160b, the development system may output an indication of the developer to the mentor device (e.g., associated with the possible mentor). For example, the development system may transmit, and the mentor device may receive, the indication of the developer in response to determining the possible mentor (e.g., as described in connection with reference number 155).

The mentor device may output a representation of the developer. In some implementations, the indication of the developer may be included in a message, such as an email message and/or a text message, among other examples. Accordingly, the mentor device may output the message to the possible mentor (e.g., using an output component of the mentor device). Additionally, or alternatively, the development system may transmit instructions for a UI that includes the indication of the developer. Accordingly, the mentor device may output the UI to the possible mentor (e.g., using an output component of the mentor device). The UI may be similar to the UI shown in FIGS. 1B, 1C, and 1E.

As shown by reference number 165b, the mentor device may transmit, and the development system may receive, a confirmation in response to the indication of the developer. In one example, the possible mentor may provide input (e.g., using an input component of the mentor device) that triggers the mentor device to transmit the confirmation. For example, the mentor device may output a UI, indicating the developer, to the possible mentor (e.g., using an output component of the mentor device). Accordingly, the possible mentor may interact with the UI (e.g., with a button or another interactive element associated with the developer) to trigger the mentor device to transmit the confirmation.

By refraining from transmitting the indication of the possible mentor (e.g., as described in connection with reference number 160a) until the possible mentor provides the confirmation, the development system saves the developer's time and conserves network resources that otherwise would have been wasted in the developer contacting the possible mentor when the possible mentor was unable (and/or unwilling) to help.

Figure 1F:
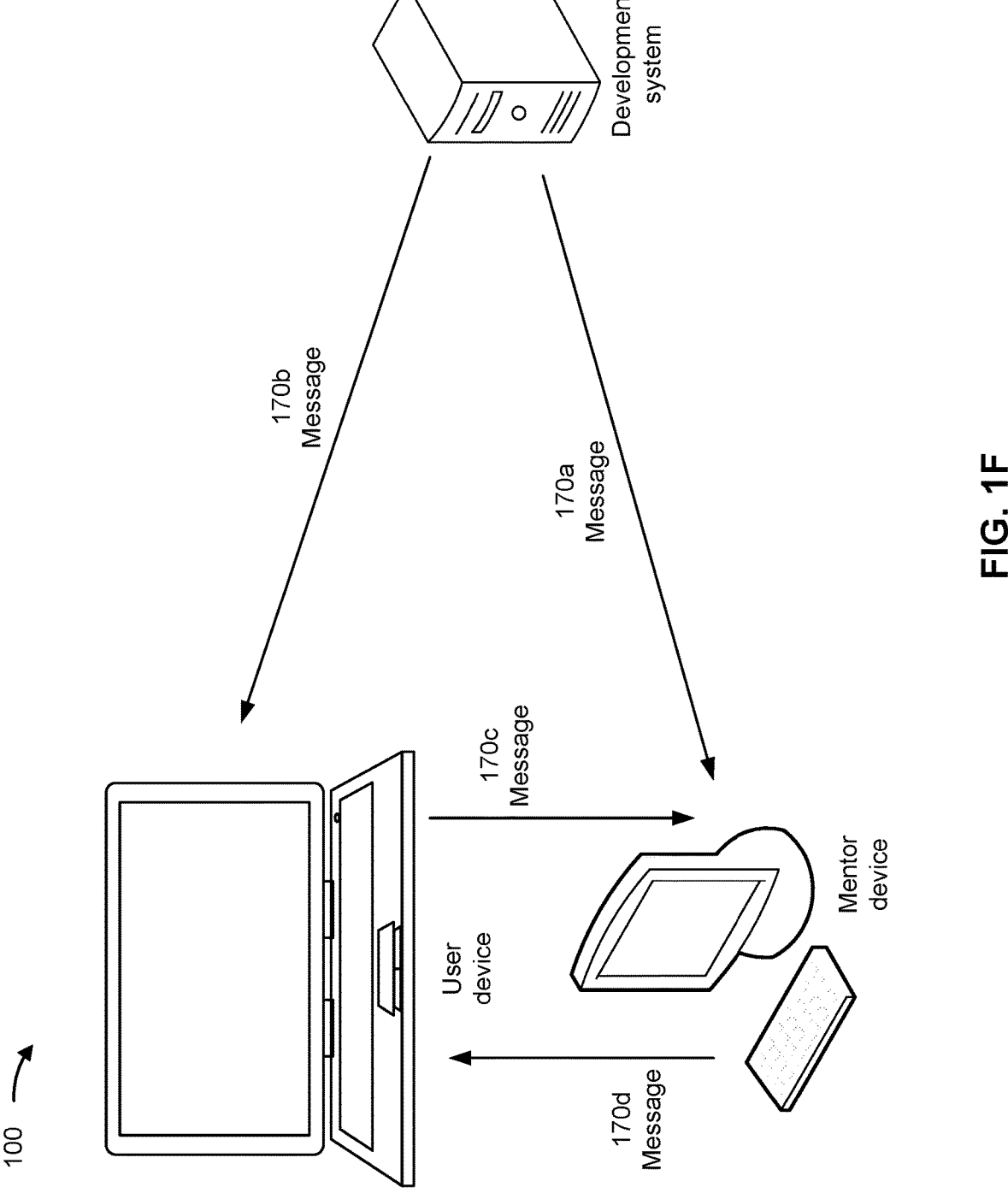

FIG. 1F shows different scenarios for connecting the developer and the possible mentor. In one example, as shown by reference number 170a, the development system may transmit, and the mentor device may receive, a message (e.g., to introduce the developer to the possible mentor). For example, the development system may transmit the message to the mentor device in response to a confirmation from the user device, as described in connection with reference number 165a. The message may be an email message and/or a text message, among other examples.

Additionally, or alternatively, as shown by reference number 170b, the development system may transmit, and the user device may receive, a message (e.g., to introduce the possible mentor to the developer). For example, the development system may transmit the message to the user device in response to a confirmation from the mentor device, as described in connection with reference number 165b. The message may be an email message and/or a text message, among other examples. In a combinatory example, the development system may include both the developer and the possible mentor on a "To" line of an email message or may transmit a text message to a group including a phone number associated with the developer and a phone number associated with the possible mentor. In another combinatory example, the development system may include the developer on a "To" line and the possible mentor on a "CC" line of an email message or may include the possible mentor on a "To" line and the developer on a "CC" line of an email message.

The mentor device and the user device may additionally communicate directly. For example, the indication of the possible mentor may include an email address and/or a phone number associated with the possible mentor, such that the user device may transmit, and the mentor device may receive, a message (e.g., to ask the possible mentor for help), as shown by reference number 170c. In another example, the indication of the developer may include an email address and/or a phone number associated with the developer, such that the mentor device may transmit, and the user device may receive, a message (e.g., to ask if the developer would like help), as shown by reference number 170d.

By using techniques as described in connection with FIGS. 1A-1F, the developer receives the indication of the training model and/or the indication of the possible mentor, based on the set of quality indicators determined by the ML model. As a result, the developer is more likely to improve based on the training module and/or the possible mentor, and the computer resources expended in running the ML model are efficiently used rather than wasted. Additionally, because the developer is less likely to introduce similar problems into future sets of computer code, the future sets of computer code are more likely to result in computer programs that efficiently use computing resources, are secure, and/or otherwise exhibit fewer bugs (if any) when deployed.

As indicated above, FIGS. 1A-1F are provided as an example. Other examples may differ from what is described with regard to FIGS. 1A-1F.

Figure 2:
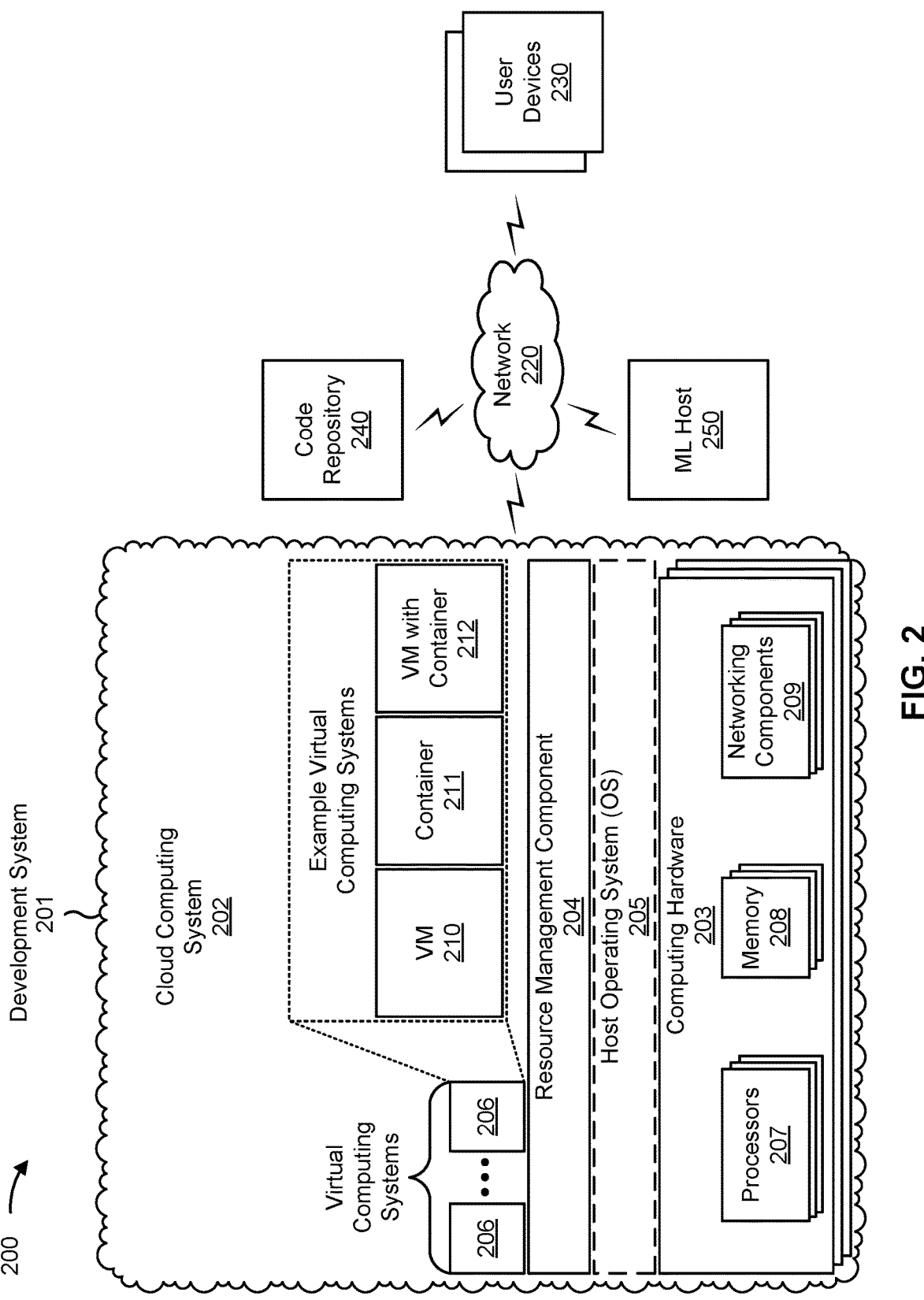
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a development system 201, which may include one or more elements of and/or may execute within a cloud computing system 202. The cloud computing system 202 may include one or more elements 203-212, as described in more detail below. As further shown in FIG. 2, environment 200 may include a network 220, a set of user devices 230, a code repository 240, and/or an ML host 250. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the development system 201 may include one or more elements 203-212 of the cloud computing system 202, may execute within the cloud computing system 202, and/or may be hosted within the cloud computing system 202, in some implementations, the development system 201 may not be cloud-based (e.g., may be implemented outside of a cloud computing system) or may be partially cloud-based. For example, the development system 201 may include one or more devices that are not part of the cloud computing system 202, such as device 300 of FIG. 3, which may include a standalone server or another type of computing device. The development system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The set of user devices 230 may include one or more devices capable of receiving, generating, storing, processing, and/or providing information associated with computer code, as described elsewhere herein. At least one device in the set of user devices 230 may function as a mentor device, as described in connection with FIGS. 1E and 1F. The set of user devices 230 may include a set of communication devices and/or computing devices. For example, the set of user devices 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The set of user devices 230 may communicate with one or more other devices of environment 200, as described elsewhere herein.

The code repository 240 may include one or more devices capable of receiving, generating, storing, processing, and/or providing information associated with computer code, as described elsewhere herein. For example, the code repository 240 may include Github® or SourceForge®, among other examples. The code repository 240 may include a communication device and/or a computing device. For example, the code repository 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The code repository 240 may communicate with one or more other devices of environment 200, as described elsewhere herein.

The ML host 250 may include one or more devices capable of receiving, generating, storing, processing, and/or providing information associated with machine learning models, as described elsewhere herein. The ML host 250 may include a communication device and/or a computing device. For example, the ML host 250 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 250 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
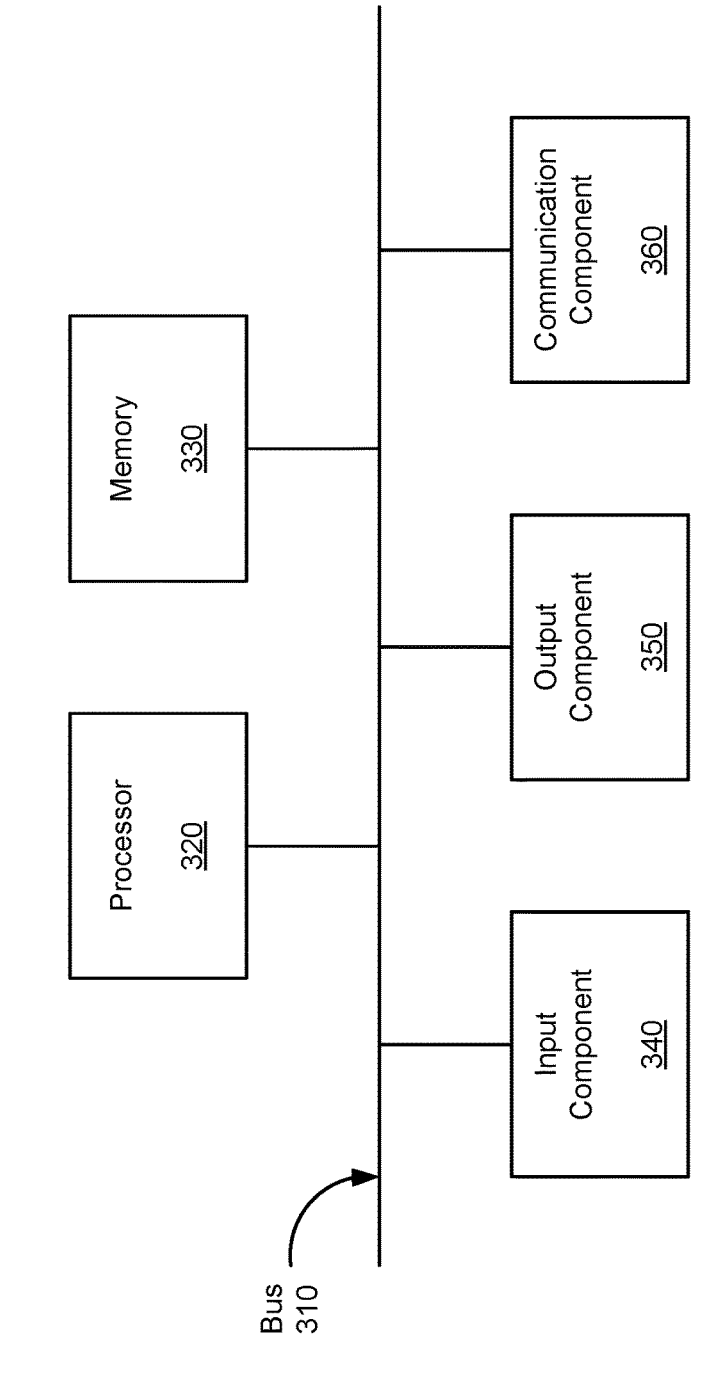
FIG. 3 is a diagram of example components of one or more devices of FIG. 2, in accordance with some embodiments of the present disclosure.

FIG. 3 is a diagram of example components of a device 300 associated with assessing computer code using machine learning. The device 300 may correspond to a user device 230, a code repository 240, and/or an ML host 250. In some implementations, a user device 230, a code repository 240, and/or an ML host 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with assessing computer code using machine learning. In some implementations, one or more process blocks of FIG. 4 may be performed by a development system 201. In some implementations, one or more process blocks of FIG. 4 may be performed by another device or a group of devices separate from or including the development system 201, such as a user device 230, a code repository 240, and/or an ML host 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a set of computer code associated with a user (block 410). For example, the development system 201 (e.g., using processor 320, memory 330, and/or communication component 360) may receive a set of computer code associated with a user, as described above in connection with reference number 115 of FIG. 1A. As an example, a code repository may transmit, and the development system 201 may receive, the set of computer code. Additionally, or alternatively, a user device may transmit, and the development system 201 may receive, the set of computer code.

As further shown in FIG. 4, process 400 may include providing the set of computer code to a machine learning model to receive a set of quality indicators associated with the set of computer code (block 420). For example, the development system 201 (e.g., using processor 320, memory 330, and/or communication component 360) may provide the set of computer code to a machine learning model to receive a set of quality indicators associated with the set of computer code, as described above in connection with reference numbers 120 and 125 of FIG. 1B. As an example, the development system 201 may transmit, and an ML host may receive, a request including the set of computer code. Accordingly, the ML host may transmit, and the development system 201 may receive, the set of quality indicators. In one example, the machine learning model may be configured to compare the set of computer code to previous sets of computer code labeled as high quality (e.g., in order to determine the set of quality indicators). Additionally, or alternatively, the machine learning model may be configured to cluster the set of computer code with previous sets of computer code (e.g., in order to calculate the set of quality indicators based on distances between clusters).

As further shown in FIG. 4, process 400 may include outputting the set of quality indicators to a user device (block 430). For example, the development system 201 (e.g., using processor 320, memory 330, and/or communication component 360) may output the set of quality indicators to a user device, as described above in connection with reference number 130 of FIG. 1B. As an example, the development system 201 may transmit, and the user device may receive, the set of quality indicators in response to an indication (e.g., of a location of the set of computer code) from the user device.

As further shown in FIG. 4, process 400 may include determining, using the set of quality indicators, at least one training module out of a plurality of possible training modules (block 440). For example, the development system 201 (e.g., using processor 320 and/or memory 330) may determine, using the set of quality indicators, at least one training module out of a plurality of possible training modules, as described above in connection with reference number 135 of FIG. 1C. As an example, the development system 201 may map the set of quality indicators to the at least one training module (e.g., mapping a quality indicator associated with low security to a training on improving security in computer code, among other examples). Additionally, or alternatively, the machine learning model may output, and the development system 201 may receive, an indication of the at least one training module (e.g., together with the set of quality indicators).

As further shown in FIG. 4, process 400 may include outputting an indication of the at least one training module to the user device (block 450). For example, the development system 201 (e.g., using processor 320, memory 330, and/or communication component 360) may output an indication of the at least one training module to the user device, as described above in connection with reference number 140 of FIG. 1C. As an example, the indication of the at least one training module may be included in a message, such as an email message and/or a text message, among other examples. Additionally, or alternatively, the development system 201 may transmit instructions for a UI that includes the indication of the at least one training module.

As further shown in FIG. 4, process 400 may include determining, using the set of quality indicators, a possible mentor out of a plurality of additional users (block 460). For example, the development system 201 (e.g., using processor 320 and/or memory 330) may determine, using the set of quality indicators, a possible mentor out of a plurality of additional users, as described above in connection with reference number 155 of FIG. 1E. As an example, the development system 201 may map the set of quality indicators to a set of expertises associated with the possible mentor (e.g., mapping a quality indicator associated with low security to an additional user labeled as having expertise in security, among other examples). Additionally, or alternatively, the machine learning model may output, and the development system 201 may receive, an indication of the possible mentor (e.g., together with the set of quality indicators).

As further shown in FIG. 4, process 400 may include transmitting a message to a device associated with the possible mentor (block 470). For example, the development system 201 (e.g., using processor 320, memory 330, and/or communication component 360) may transmit a message to a device associated with the possible mentor, as described above in connection with reference number 170a of FIG. 1F. As an example, the message may include an email message and/or a text message, among other examples, to introduce the user to the possible mentor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

FIG. 5 is a flowchart of an example process 500 associated with receiving computer code quality indicators based on machine learning. In some implementations, one or more process blocks of FIG. 5 may be performed by a user device 230. In some implementations, one or more process blocks of FIG. 5 may be performed by another device or a group of devices separate from or including the user device 230, such as a development system 201, a code repository 240, and/or an ML host 250. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include transmitting a set of computer code associated with a user (block 510). For example, the user device 230 (e.g., using processor 320, memory 330, and/or communication component 360) may transmit a set of computer code associated with a user, as described above in connection with FIG. 1A. As an example, the user device 230 may transmit, and a development system may receive, the set of computer code. Additionally, or alternatively, the user device 230 may transmit, and the development system may receive, an indication of a location of the set of computer code (e.g., such that the development system may retrieve the set of computer code).

As further shown in FIG. 5, process 500 may include receiving a set of quality indicators associated with the set of computer code (block 520). For example, the user device 230 (e.g., using processor 320, memory 330, and/or communication component 360) may receive a set of quality indicators associated with the set of computer code, as described above in connection with reference number 130 of FIG. 1B. As an example, the development system may transmit, and the user device 230 may receive, the set of quality indicators in response to the set of computer code from the user device 230 (and/or the indication of the location of the set of computer code from the user device 230).

As further shown in FIG. 5, process 500 may include outputting a representation of the set of quality indicators (block 530). For example, the user device 230 (e.g., using processor 320, memory 330, and/or output component 350) may output a representation of the set of quality indicators, as described above in connection with FIG. 1B. As an example, the set of quality indicators may be included in a message, such as an email message and/or a text message, among other examples. Accordingly, the user device 230 may output the message to a user of the user device. Additionally, or alternatively, the user device 230 may receive instructions for a UI that includes the set of quality indicators. Accordingly, the user device 230 may output the UI to the user of the user device. The UI may be as shown in FIGS. 1B, 1C, and 1E.

As further shown in FIG. 5, process 500 may include receiving an indication of at least one training module based on the set of quality indicators (block 540). For example, the user device 230 (e.g., using processor 320, memory 330, and/or communication component 360) may receive an indication of at least one training module based on the set of quality indicators, as described above in connection with reference number 140 of FIG. 1C. As an example, the development system may transmit, and the user device 230 may receive, the indication of the at least one training module in response to the set of computer code from the user device 230 (and/or the indication of the location of the set of computer code from the user device 230).

As further shown in FIG. 5, process 500 may include outputting a representation of the at least one training module (block 550). For example, the user device 230 (e.g., using processor 320, memory 330, and/or output component 350) may output a representation of the at least one training module, as described above in connection with FIG. 1C. As an example, the indication of the at least one training module may be included in a message, such as an email message and/or a text message, among other examples. Accordingly, the user device 230 may output the message to the user of the user device. Additionally, or alternatively, the user device 230 may receive instructions for a UI that indicates the at least one training module. Accordingly, the user device 230 may output the UI to the user of the user device. The UI may be as shown in FIGS. 1B, 1C, and 1E.

As further shown in FIG. 5, process 500 may include receiving an indication of a possible mentor based on the set of quality indicators (block 560). For example, the user device 230 (e.g., using processor 320, memory 330, and/or communication component 360) may receive an indication of a possible mentor based on the set of quality indicators, as described above in connection with reference number 160a of FIG. 1E. As an example, the development system may transmit, and the user device 230 may receive, the indication of the possible mentor in response to the set of computer code from the user device 230 (and/or the indication of the location of the set of computer code from the user device 230).

As further shown in FIG. 5, process 500 may include outputting a representation of the possible mentor (block 570). For example, the user device 230 (e.g., using processor 320, memory 330, and/or output component 350) may output a representation of the possible mentor, as described above in connection with FIG. 1E. As an example, the indication of the possible mentor may be included in a message, such as an email message and/or a text message, among other examples. Accordingly, the user device 230 may output the message to the user of the user device. Additionally, or alternatively, the user device 230 may receive instructions for a UI that indicates the possible mentor. Accordingly, the user device 230 may output the UI to the user of the user device. The UI may be as shown in FIGS. 1B, 1C, and 1E.

As further shown in FIG. 5, process 500 may include transmitting a message to a device associated with the possible mentor (block 580). For example, the user device 230 (e.g., using processor 320, memory 330, and/or communication component 360) may transmit a message to a device associated with the possible mentor, as described above in connection with reference number 170c of FIG. 1F.

As an example, the message may include an email message and/or a text message, among other examples, to ask the possible mentor for help.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for assessing computer code using machine learning, the system comprising:
    one or more memories; and
    one or more processors, communicatively coupled to the one or more memories, configured to:
        receive a set of computer code associated with a user;
        provide the set of computer code to a machine learning model to receive a set of quality indicators associated with the set of computer code;
        output the set of quality indicators to a user device;
        determine, using the set of quality indicators, at least one training module out of a plurality of possible training modules;
        output an indication of the at least one training module to the user device;
        determine, using the set of quality indicators, a possible mentor out of a plurality of additional users; and
        transmit, to a device associated with the possible mentor, a message introducing the user to the possible mentor.

2. The system of claim 1, wherein the message comprises an email message or a text message.

3. The system of claim 1, wherein the set of computer code comprises one or more files.

4. The system of claim 3, wherein the one or more processors, to receive the set of computer code, are configured to:
    receive, from the user device, an indication of a location of the one or more files;
    transmit a request, for the one or more files, that indicates the location; and
    receive the one or more files in response to the request.

5. The system of claim 3, wherein the one or more processors, to receive the set of computer code, are configured to:
    receive the one or more files from the user device.

6. The system of claim 1, wherein the one or more processors are configured to:
    receive, from the user device, a confirmation associated with the possible mentor,
        wherein the message is transmitted in response to the confirmation.

7. The system of claim 1, wherein the set of quality indicators includes one or more of:
    a quality indicator associated with a style rule;
    a quality indicator associated with a complexity rule; or
    a quality indicator associated with a security rule.

8. A method of assessing computer code using machine learning, comprising:
    receiving, at a development system, a set of computer code associated with a user;
    providing, by the development system, the set of computer code to a machine learning model to receive a set of quality indicators associated with the set of computer code;
    outputting, from the development system and to a user device, the set of quality indicators;
    determining, by the development system and using the set of quality indicators, a possible mentor out of a plurality of additional users; and
    transmitting, from the development system and to a device associated with the possible mentor, a message introducing the user to the possible mentor.

9. The method of claim 8, wherein transmitting the message comprises:
    transmitting, to the device associated with the possible mentor, an indication of the user.

10. The method of claim 9, further comprising:
    receiving, from the device associated with the possible mentor, a confirmation in response to the indication of the user; and
    transmitting, to the user device, an indication of the possible mentor.

11. The method of claim 8, wherein determining the possible mentor comprises:
    mapping the set of quality indicators to a set of expertises associated with the possible mentor.

12. The method of claim 8, wherein determining the possible mentor comprises:
    receiving a list of mentors from the machine learning model; and
    selecting the possible mentor from the list of mentors.

13. The method of claim 8, wherein providing the set of computer code to the machine learning model comprises:
    transmitting the set of computer code to a machine learning host associated with the machine learning model; and
    receiving the set of quality indicators from the machine learning host and in response to transmitting the set of computer code.

14. A non-transitory computer-readable medium storing a set of instructions for assessing computer code using machine learning, the set of instructions comprising:

one or more instructions that, when executed by one or more processors of a device, cause the device to:

transmit a set of computer code associated with a user;

receive a set of quality indicators associated with the set of computer code;

output a representation of the set of quality indicators;

receive an indication of at least one training module based on the set of quality indicators;

output a representation of the at least one training module;

receive an indication of a possible mentor based on the set of quality indicators;

output a representation of the possible mentor; and transmit, to a device associated with the possible mentor, a message introducing the user to the possible mentor.

15. The non-transitory computer-readable medium of claim 14, wherein the one or more instructions, when executed by the one or more processors, cause the device to:

receive a confirmation of the possible mentor, wherein the message is transmitted, to the device associated with the possible mentor, in response to the confirmation.

16. The non-transitory computer-readable medium of claim 14, wherein the representation of the set of quality indicators and the representation of the at least one training module are included on a same user interface.

17. The non-transitory computer-readable medium of claim 14, wherein the one or more instructions, when executed by the one or more processors, cause the device to:

receive a confirmation of the at least one training module;

transmit a request for the at least one training module in response to the confirmation;

receive multimedia content, associated with the at least one training module, in response to the request; and output the multimedia content.

18. The non-transitory computer-readable medium of claim 14, wherein the one or more instructions, when executed by the one or more processors, cause the device to:

transmit a set of credentials associated with a code repository storing the set of computer code.

19. The non-transitory computer-readable medium of claim 14, wherein the one or more instructions, that cause the device to transmit the set of computer code, cause the device to:

transmit an indication of a location of the set of computer code.

20. The non-transitory computer-readable medium of claim 14, wherein the one or more instructions, that cause the device to transmit the set of computer code, cause the device to:

transmit one or more files including the set of computer code.

\* \* \* \* \*